US012484632B2

United States Patent
Kim et al.

(10) Patent No.: US 12,484,632 B2
(45) Date of Patent: Dec. 2, 2025

(54) AEROSOL GENERATING DEVICE AND METHOD OF OPERATION THEREOF

(71) Applicant: KT&G CORPORATION, Daejeon (KR)

(72) Inventors: Yong Hwan Kim, Anyang-si (KR); Dae Nam Han, Seoul (KR); Sung Wook Yoon, Suwon-si (KR); Seung Won Lee, Gwangmyeong-si (KR); Seok Su Jang, Daejeon (KR)

(73) Assignee: KT&G Corporation, Daejeon (KR)

( * ) Notice: Subject to any disclaimer, the term of this patent is extended or adjusted under 35 U.S.C. 154(b) by 575 days.

(21) Appl. No.: 17/802,559

(22) PCT Filed: Nov. 1, 2021

(86) PCT No.: PCT/KR2021/015583
§ 371 (c)(1),
(2) Date: Aug. 26, 2022

(87) PCT Pub. No.: WO2022/098020
PCT Pub. Date: May 12, 2022

(65) Prior Publication Data
US 2023/0144267 A1     May 11, 2023

(30) Foreign Application Priority Data
Nov. 3, 2020   (KR) .................. 10-2020-0145531

(51) Int. Cl.
*A24F 40/53*   (2020.01)
*A24F 40/10*   (2020.01)
(Continued)

(52) U.S. Cl.
CPC .............. *A24F 40/53* (2020.01); *A24F 40/40* (2020.01); *A24F 40/42* (2020.01); *A24F 40/46* (2020.01);
(Continued)

(58) Field of Classification Search
None
See application file for complete search history.

(56) References Cited

U.S. PATENT DOCUMENTS 9,831,661 B2   11/2017  Chung
11,116,255 B2   9/2021  Mizuguchi et al.
(Continued)

FOREIGN PATENT DOCUMENTS

CN   110891808 A   3/2020
JP   6-335153 A   12/1994
(Continued)

OTHER PUBLICATIONS

Communication dated Oct. 27, 2023 issued by the Russian Patent Office in application No. 2022125393.
(Continued)

*Primary Examiner* — Philip Y Louie
*Assistant Examiner* — Madeleine P Delacruz
(74) *Attorney, Agent, or Firm* — Foley & Lardner LLP

(57) ABSTRACT

An aerosol generating device may include: a heater; a wetting detection module configured to generate a wetting signal by being electrically shorted as the wetting detection module comes into contact with a liquid introduced from outside the aerosol generating device or a liquid leaked from inside the aerosol generating device; and a control circuit configured to determine whether the wetting signal indicating an electrical short has been received from the wetting detection module, and control the heater based on a determination that the wetting signal has been received.

11 Claims, 9 Drawing Sheets

(51) Int. Cl.
  *A24F 40/40* (2020.01)
  *A24F 40/42* (2020.01)
  *A24F 40/46* (2020.01)
  *A24F 40/50* (2020.01)
  *A24F 40/51* (2020.01)
  *A24F 40/60* (2020.01)
  *A24F 40/65* (2020.01)
  *A24F 40/90* (2020.01)

(52) U.S. Cl.
  CPC .............. *A24F 40/50* (2020.01); *A24F 40/51* (2020.01); *A24F 40/60* (2020.01); *A24F 40/65* (2020.01); *A24F 40/90* (2020.01); *A24F 40/10* (2020.01)

(56) References Cited

U.S. PATENT DOCUMENTS

| | | | |
|---|---|---|---|
| 2018/0184711 | A1 | 7/2018 | Dickens et al. |
| 2018/0246051 | A1 | 8/2018 | Matsuoka et al. |
| 2019/0208821 | A1* | 7/2019 | Fraser ................ H05B 1/0297 |
| 2021/0015164 | A1* | 1/2021 | Mizuguchi ............. A24F 40/51 |
| 2021/0145073 | A1 | 5/2021 | Lee et al. |
| 2021/0195959 | A1 | 7/2021 | Lee et al. |
| 2022/0248770 | A1* | 8/2022 | Taschner ................ A24F 40/51 |
| 2023/0172269 | A1 | 6/2023 | Fraser et al. |

FOREIGN PATENT DOCUMENTS

| | | |
|---|---|---|
| JP | 2001-197175 A | 7/2001 |
| JP | 2002-355526 A | 12/2002 |
| JP | 2018-138886 A | 9/2018 |
| JP | 6683865 B1 | 4/2020 |
| KR | 10-2004-0110271 A | 12/2004 |
| KR | 10-1296158 B1 | 8/2013 |
| KR | 10-2019-0034260 A | 4/2019 |
| KR | 10-2126028 B1 | 6/2020 |
| KR | 10-2020-0084484 A | 7/2020 |
| KR | 10-2020-0111996 A | 10/2020 |
| RU | 2730234 C1 | 8/2020 |
| WO | 2019/099539 A2 | 5/2019 |
| WO | 2020/190000 A2 | 9/2020 |

OTHER PUBLICATIONS

Extended European Search Report dated Jun. 13, 2023 in European Application No. 21889485.5.
Korean Office Action dated Jul. 2, 2023 in Korean Application No. 10-2023-0060125.
International Search Report for PCT/KR2021/015583 dated, Feb. 8, 2022 (PCT/ISA/210).
Written Opinion of the International Searching Authority for PCT/KR2021/015583 dated, Feb. 8, 2022 (PCT/ISA/237).
Office Action issued Nov. 3, 2022 in Korean Application No. 10-2020-0145531.
Office Action issued Sep. 1, 2022 in Korean Application No. 10-2020-0145531.
Communication dated Apr. 16, 2024, issued in Korean Application No. 10-2024-0044801.
Chinese Office Action on Patent Application No. 202180025398.2 dated Mar. 31, 2025.

* cited by examiner

[Fig. 1]
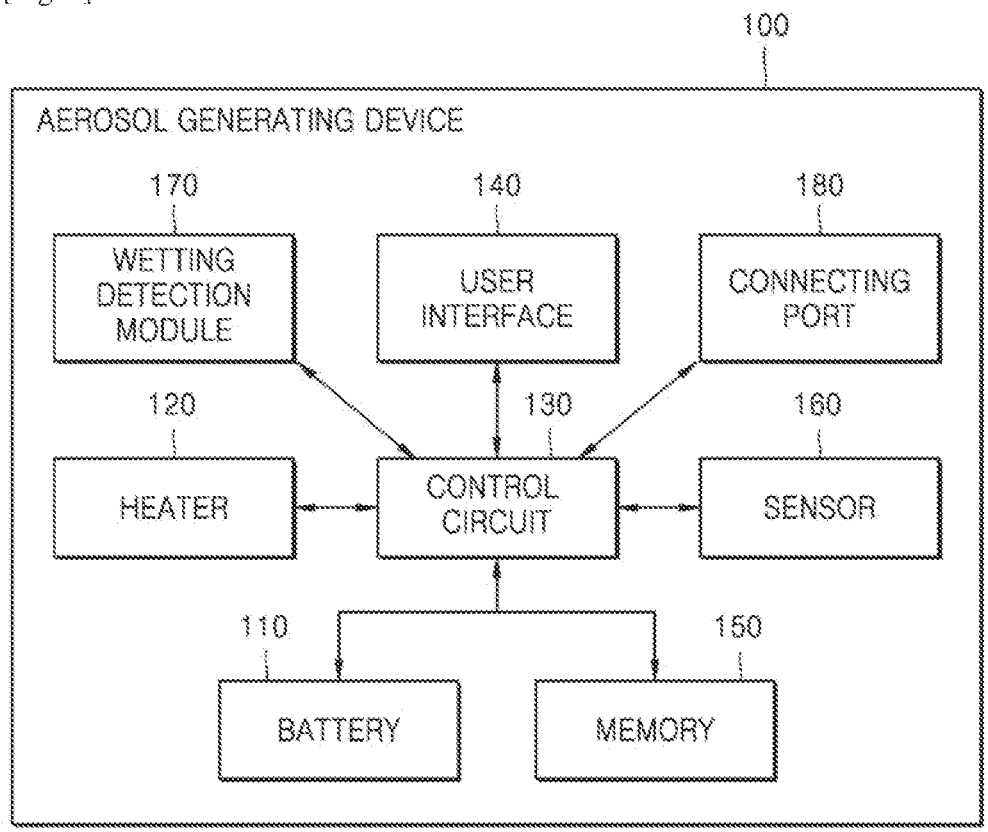
[Fig. 2A]
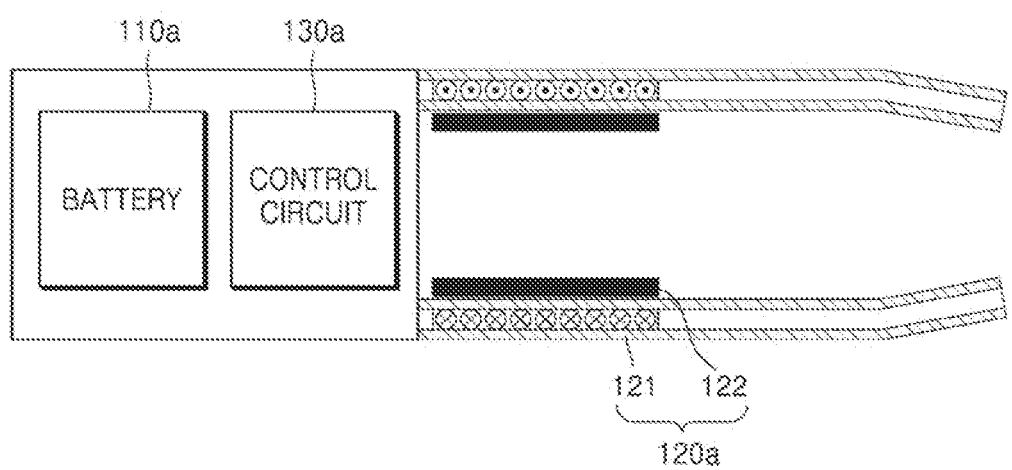

[Fig. 2B]
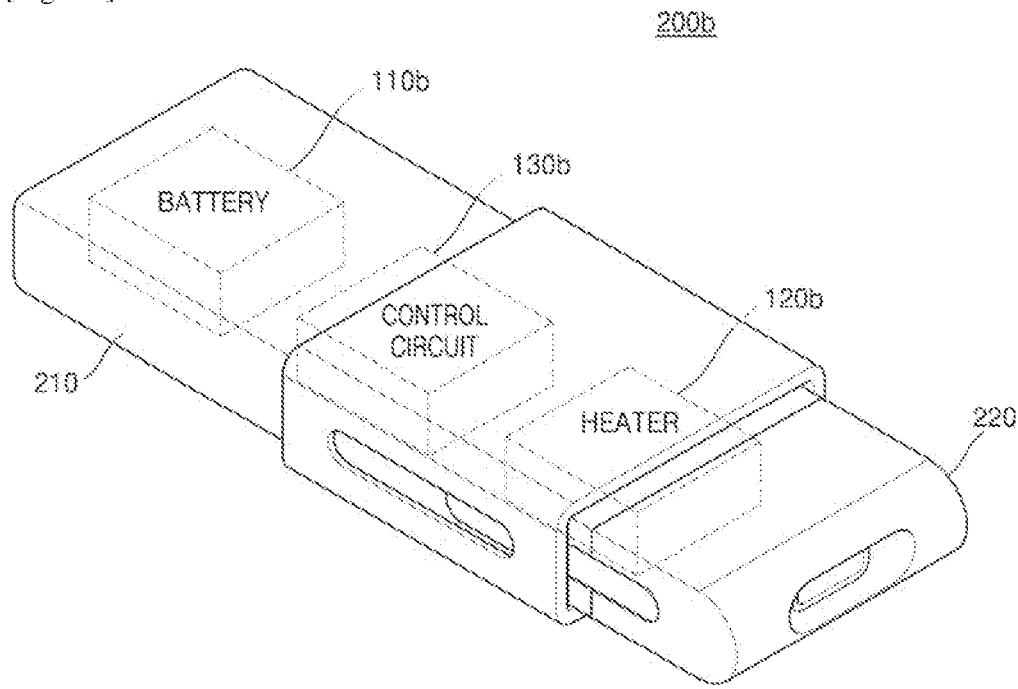
[Fig. 2C]
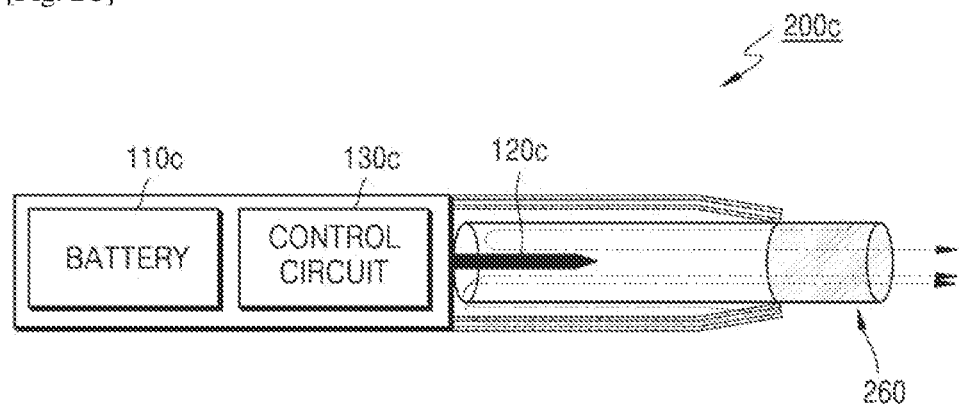
[Fig. 2D]
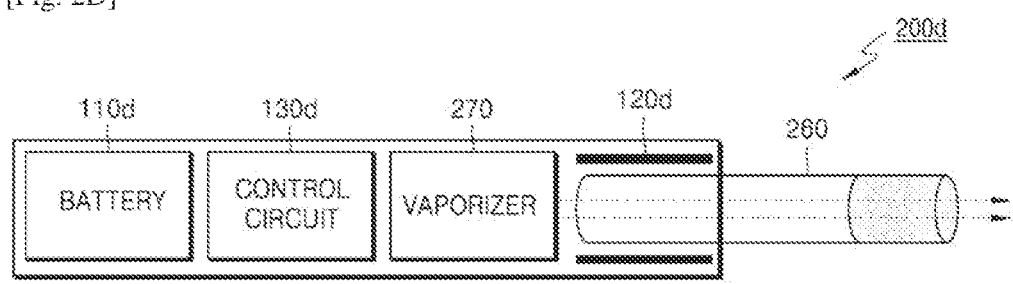

[Fig. 2E]
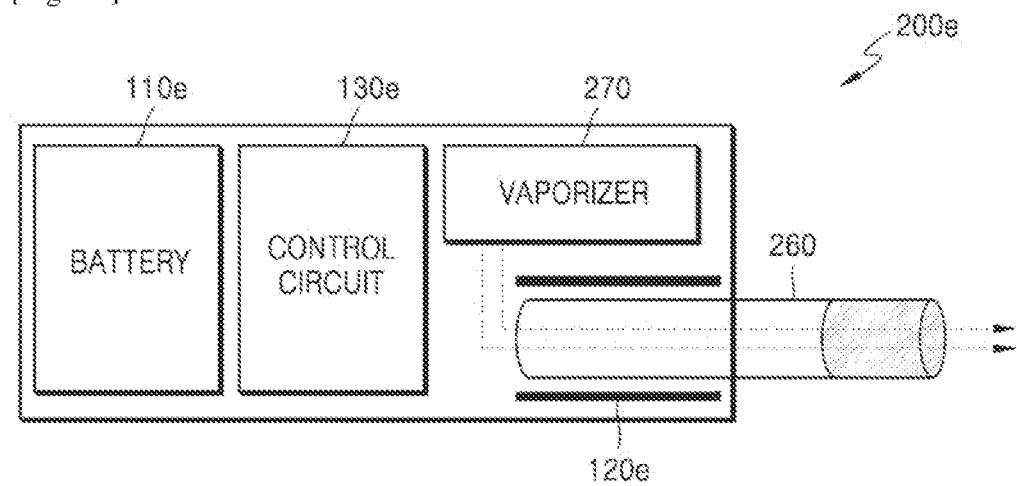
[Fig. 3]
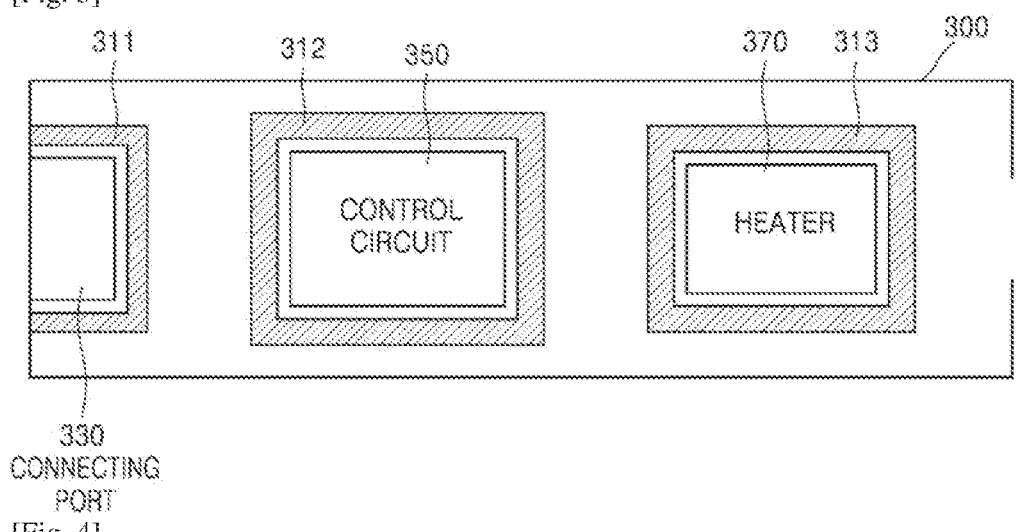
[Fig. 4]
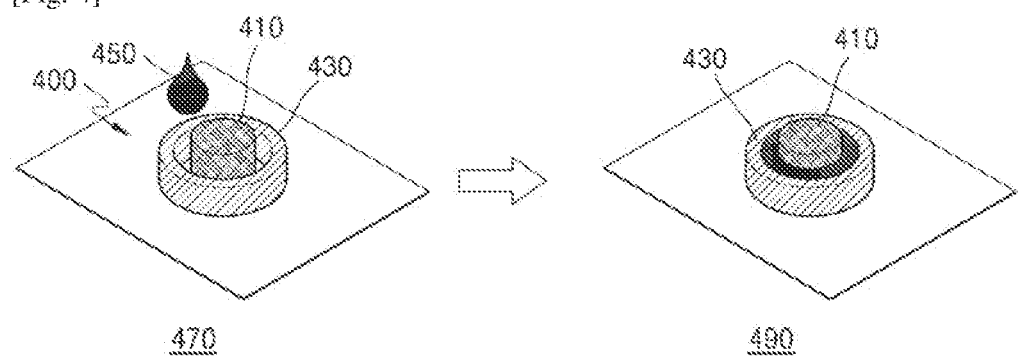

[Fig. 5A]
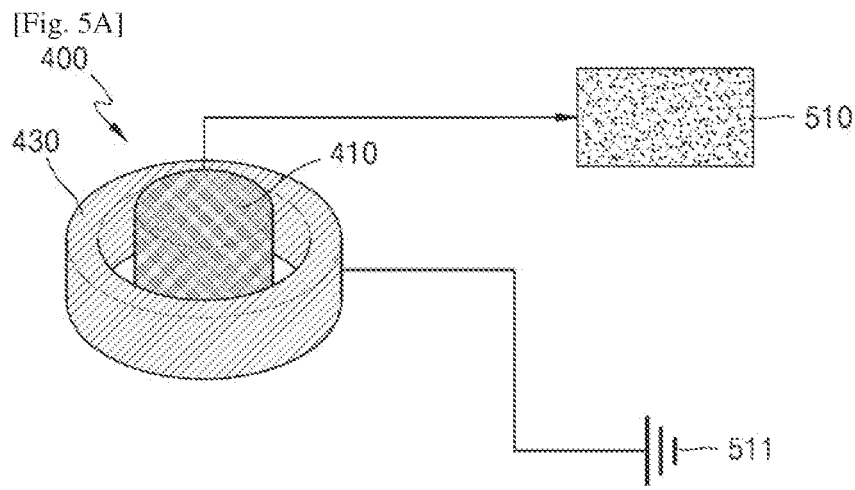
[Fig. 5B]
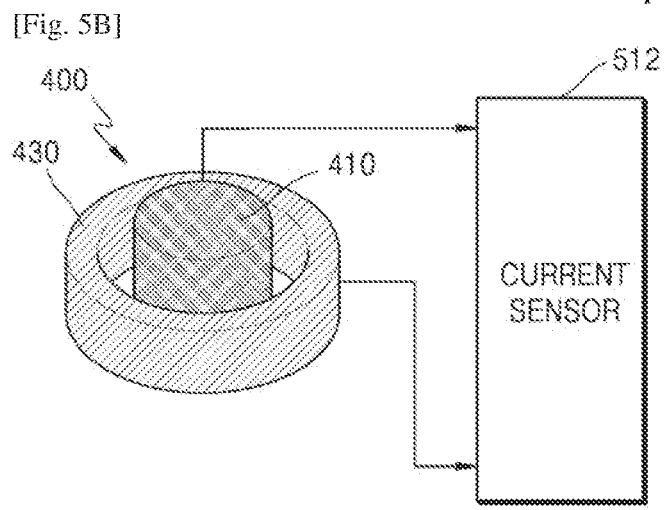
[Fig. 5C]
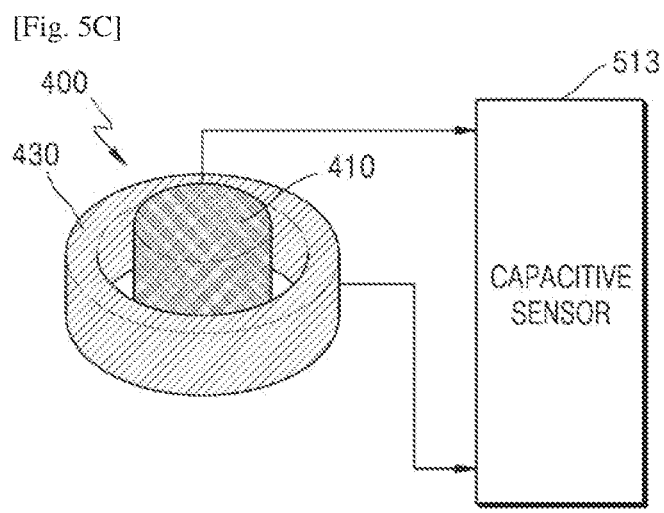

[Fig. 5D]
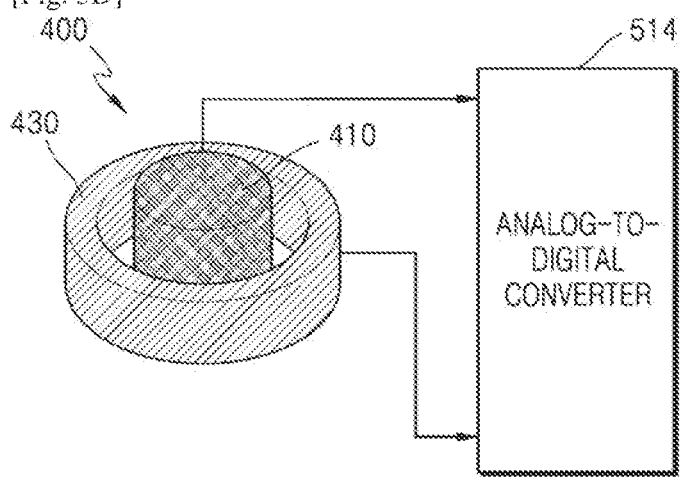
[Fig. 6]
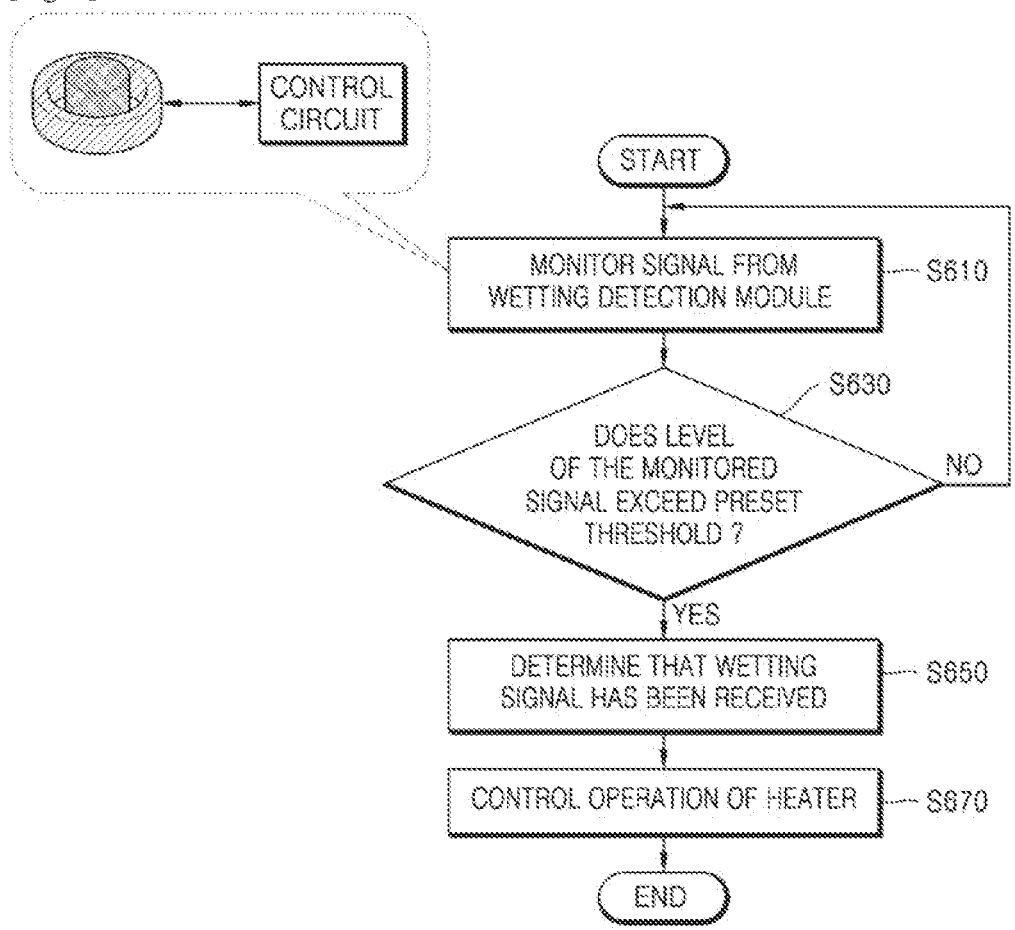

[Fig. 7]
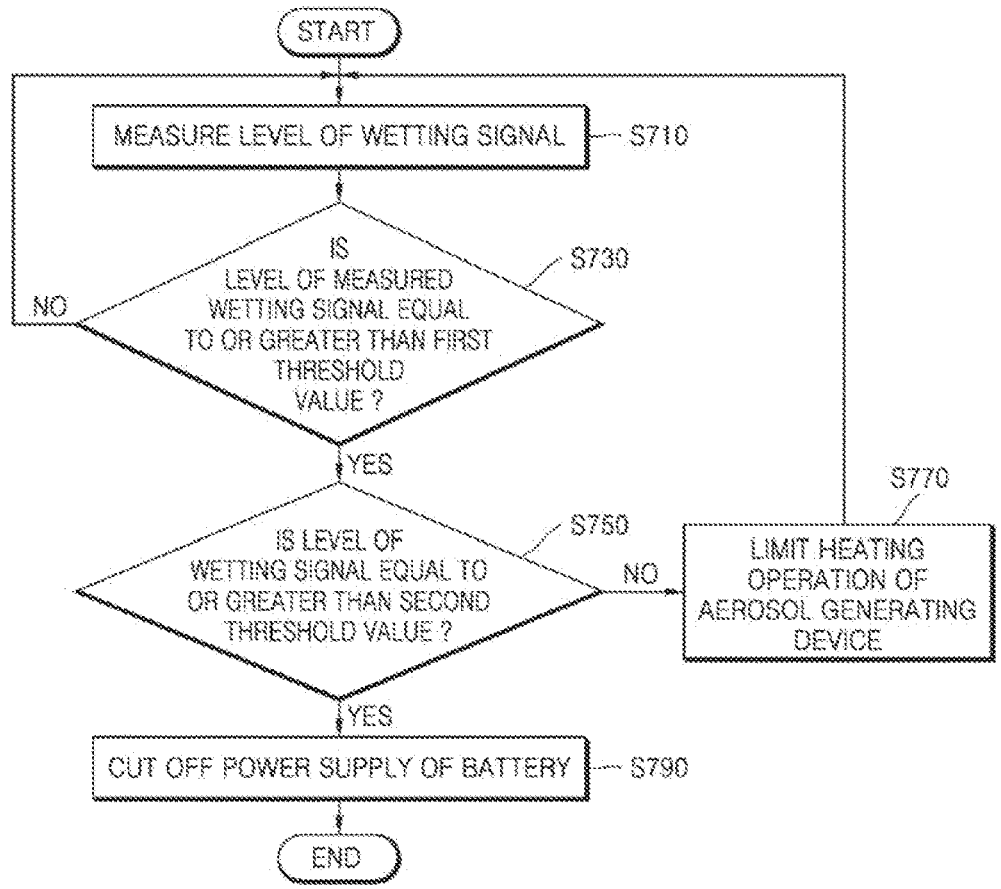
[Fig. 8A]
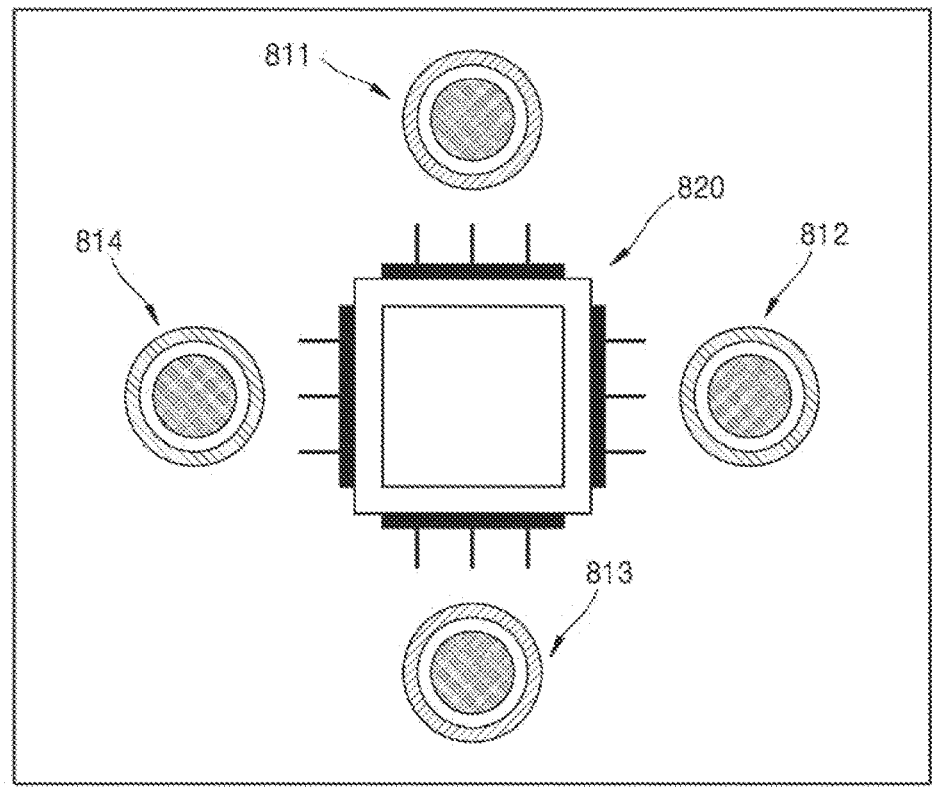

[Fig. 8B]
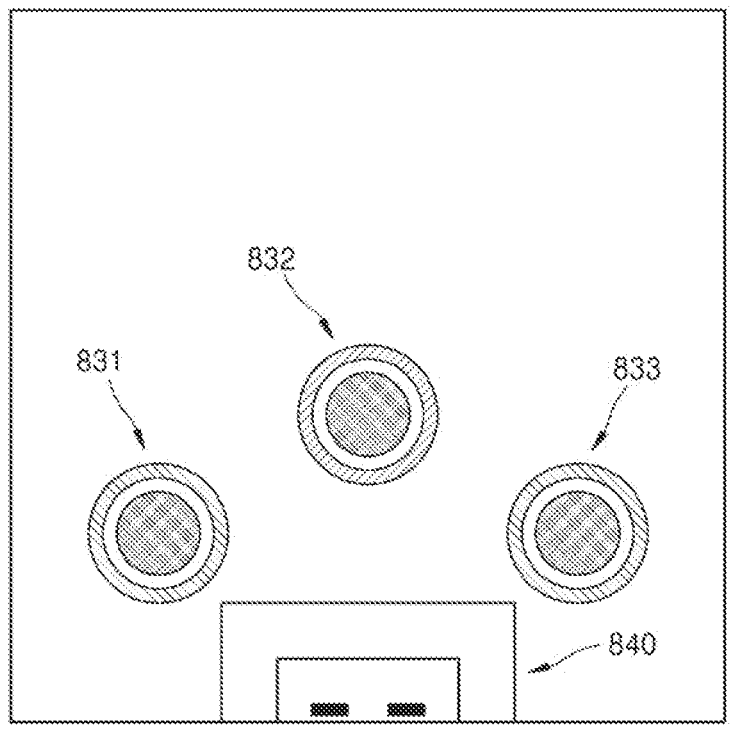
[Fig. 8C]
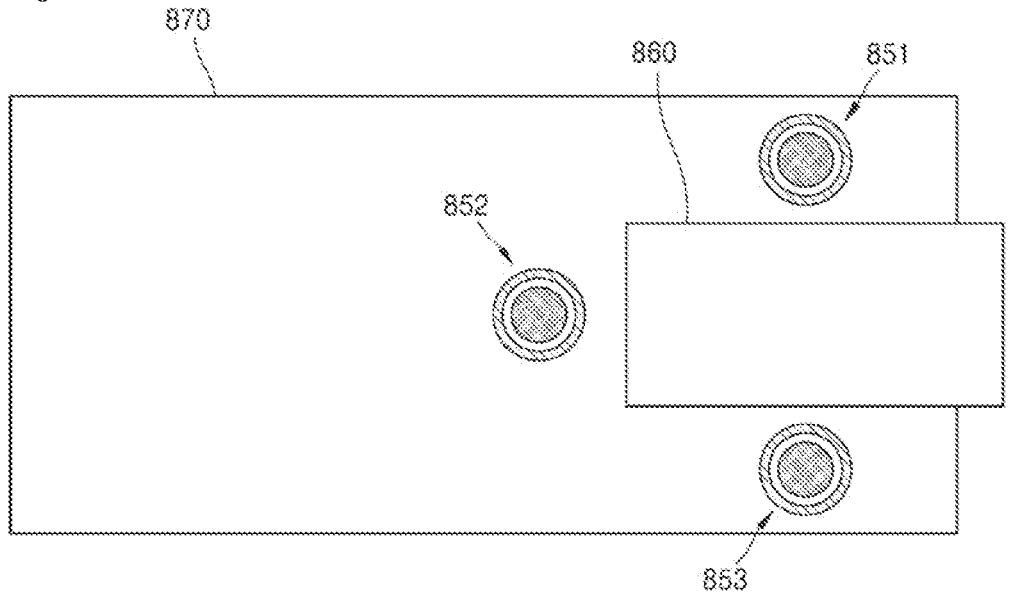
[Fig. 9A]
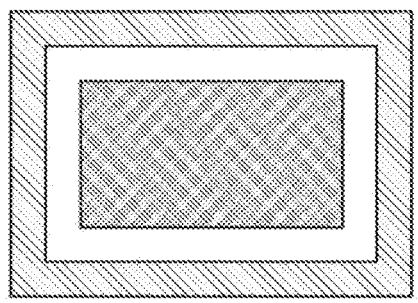

[Fig. 9B]
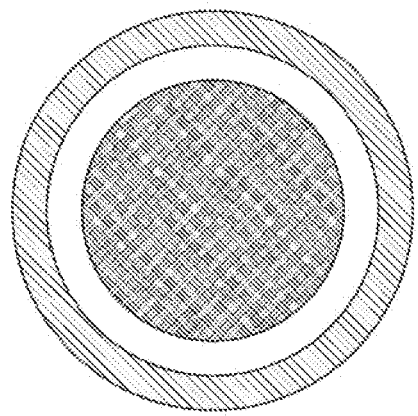
[Fig. 9C]
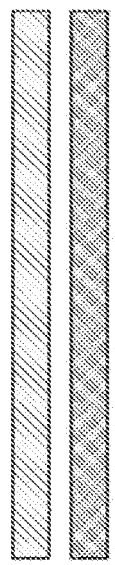
[Fig. 9D]
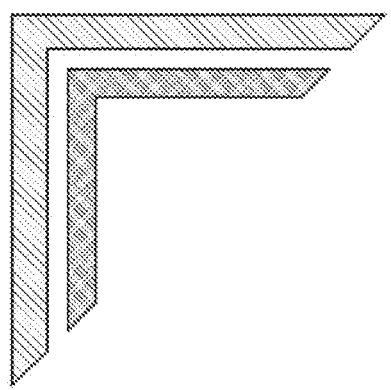
[Fig. 9E]
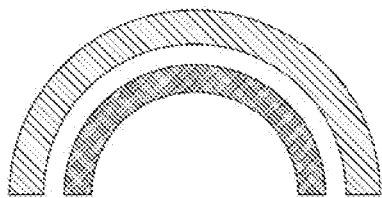

[Fig. 10]
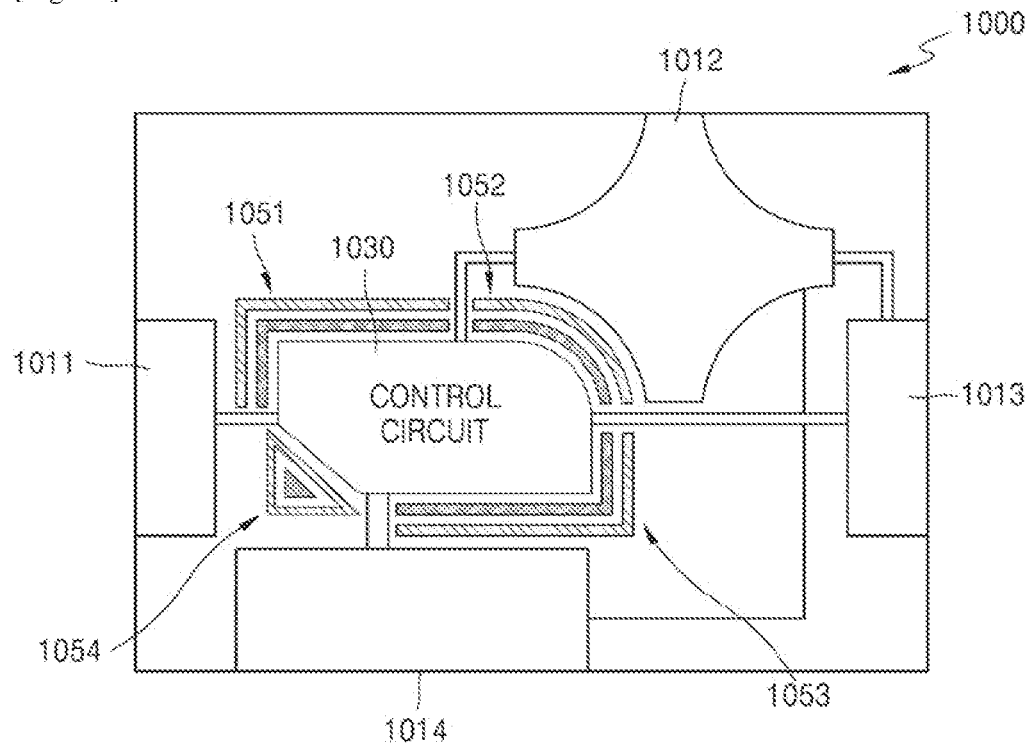
[Fig. 11]
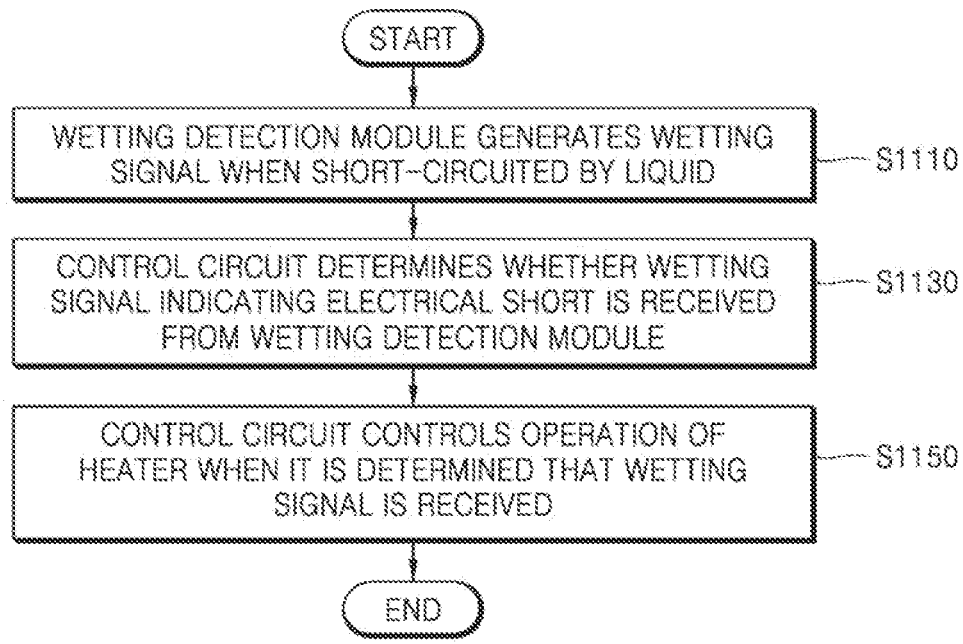

AEROSOL GENERATING DEVICE AND METHOD OF OPERATION THEREOF

TECHNICAL FIELD

The present disclosure relates to an aerosol generating device and a method of operation thereof.

BACKGROUND ART

Recently, the demand for alternative methods to overcome the disadvantages of traditional cigarettes has increased. For example, there is growing demand for an aerosol generating device which generates an aerosol by heating an aerosol generating material, rather than by combusting cigarettes. Accordingly, researches on a heating-type aerosol generating device have been actively conducted.

DISCLOSURE OF INVENTION

Technical Problem

Electrical elements of an aerosol generating device, such as a microcontroller unit (MCU), may be damaged by wetness due to liquids introduced from the external environment or liquids associated with the use of aerosol generating devices. In this case, the aerosol generating device may malfunction or fail. Therefore, it is necessary to detect whether the aerosol generating device gets wet so that appropriate measures can be taken in response to a wetness detection.

The technical problems of the present disclosure are not limited to the above-described description, and other technical problems may be derived from the embodiments to be described hereinafter.

Solution to Problem

Various embodiments may provide an aerosol generating device having a function of detecting wetness and an operating method thereof.

As a technical means for achieving the above-described technical problem, an aerosol generating device according to an aspect of the present disclosure may include a heater configured to heat an aerosol generating material; at least one wetting detection module configured to generate a wetting signal when short-circuited by a liquid which is introduced from outside of the aerosol generating device or leaked from inside of the aerosol generating device; and a control circuit configured to control operation of the heater based on the wetting signal.

In addition, the method of operation of an aerosol generating device according to another aspect of the present disclosure may include generating a wetting signal when a wetting detection module of the aerosol generating device is short-circuited by a liquid which is introduced from outside of the aerosol generating device or leaked from inside of the aerosol generating device; and controlling operation of a heater of the aerosol generating device based on the wetting signal.

Advantageous Effects of Invention

An aerosol generating device according to various embodiments of the present disclosure may inactivate the heating operation of a heater upon detecting a short circuit caused by a liquid.

As a result, the aerosol generating device according to various embodiments of the present disclosure may prevent wetting of the aerosol generating device from deepening.

In addition, the aerosol generating device according to various embodiments of the present disclosure may prevent malfunction, failure, etc. due to wetting.

BRIEF DESCRIPTION OF DRAWINGS

FIG. 1 is a block diagram illustrating a hardware configuration of an aerosol generating device according to an example embodiment.

FIG. 2A is a view for explaining elements constituting an aerosol generating device including a susceptor according to an example embodiment.

FIG. 2B is a view for explaining elements constituting a replaceable cartridge including an aerosol generating material, and an aerosol generating device including the same, according to an example embodiment.

FIGS. 2C to 2E are views illustrating examples in which a cigarette is inserted into an aerosol generating device according to an example embodiment.

FIG. 3 is a diagram illustrating examples of a region in which a wetting detection module may be located inside an aerosol generating device according to an example embodiment.

FIG. 4 is a diagram for explaining that a wetting detection module according to an example embodiment detects wetting by being electrically shorted by coming into contact with a liquid.

FIGS. 5A to 5D are diagrams for explaining a wetting detection module according to an example embodiment.

FIG. 6 is a flowchart illustrating a method of operating an aerosol generating device according to an example embodiment.

FIG. 7 is a diagram illustrating a process of controlling the operation of the aerosol generating device based on a level of a wetting signal according to an example embodiment.

FIGS. 8A to 8C are diagrams illustrating examples in which a wetting detection module is arranged in an aerosol generating device according to an example embodiment.

FIGS. 9A to 9E are diagrams illustrating shapes of a wetting detection module according to an example embodiment.

FIG. 10 is a diagram illustrating an example in which wetting detection modules having various shapes are arranged on a substrate on which a control circuit is mounted, according to an example embodiment.

FIG. 11 is a flowchart illustrating a method of operating an aerosol generating device according to an example embodiment.

MODE FOR THE INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Hereinafter, embodiments of the present disclosure will be described in detail with reference to the drawings.

FIG. 1 is a block diagram illustrating a hardware configuration of an aerosol generating device according to an example embodiment.

Referring to FIG. 1, an aerosol generating device 100 may include a battery 110, a heater 120, a control circuit 130, a user interface 140, a memory 150, a sensor 160, a wetting detection module 170, and a connecting port 180. However, the internal structure of the aerosol generating device 100 is not limited to the structures illustrated in FIG. 1. According to the design of the aerosol generating device 100, it will be understood by one of ordinary skill in the art that some of the components shown in FIG. 1 may be omitted or new components may be added.

Hereinafter, an operation of each of the components will be described without being limited to the location in a particular space in the aerosol generating device 100.

The battery 110 supplies power to be used for the aerosol generating device 100 to operate. For example, the battery 110 may supply power such that the heater 120 may be heated. In addition, the battery 110 may supply power required for operation of other components included in the aerosol generating device 100, that is, the heater 120, the control circuit 130, the user interface 140, the memory 150, the sensor 160, the wetting detection module 170, and the connecting port 180. The battery 110 may be a rechargeable battery or a disposable battery. For example, the battery 110 may be a lithium polymer (LiPoly) battery, but is not limited thereto.

The heater 120 receives power from the battery 110 under the control of the control circuit 130. The heater 120 may receive power from the battery 110 and heat an aerosol generating article inserted into the aerosol generating device 100, or heat the cartridge mounted on the aerosol generating device 100. In addition, the heater 120 may generate aerosol by heating an aerosol generating material.

The heater 120 may be located in the main body of the aerosol generating device 100. Alternatively, when the aerosol generating device 100 consists of the main body and the cartridge, the heater 120 may be located in the cartridge. When the heater 120 is located in the cartridge, the heater 120 may receive power from the battery 110 located in at least one of the main body and the cartridge.

The heater 120 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. In addition, the heater 120 may be implemented by a metal wire, a metal plate on which an electrically conductive track is arranged, or a ceramic heating element, but is not limited thereto.

The heater 120 may heat the aerosol generating article inserted into the accommodation space of the aerosol generating device 100. As the aerosol generating article is accommodated in the accommodation space of the aerosol generating device 100, the heater 120 may be located inside and/or outside the aerosol generating article. Accordingly, the heater 120 may generate aerosol by heating the aerosol generating material in the aerosol generating article.

In an embodiment, the heater 120 may be a component included in the cartridge. The cartridge may include the heater 120, the liquid delivery element, and the liquid storage. The aerosol generating material accommodated in the liquid storage may be moved to the liquid delivery element, and the heater 120 may heat the aerosol generating material absorbed by the liquid delivery element, thereby generating aerosol. For example, the heater 120 may include a material such as nickel chromium and may be wound around or arranged adjacent to the liquid delivery element.

The heater 120 may include an induction heater. The heater 120 may include an electrically conductive coil for heating an aerosol generating article in an induction heating method, and the aerosol generating article or the cartridge may include a susceptor which may be heated by the induction heater.

The control circuit 130 is hardware that controls the overall operation of the aerosol generating device 100. The control circuit 130 may include at least one processor, such as a micro controller unit (MCU). The processor may be provided in the form of an array of a plurality of logic gates or a combination of a general-purpose microprocessor and a memory in which a program executable in the microprocessor is stored. In addition, it may be understood by those skilled in the art that the processor may be provided in the form of other types of hardware.

The control circuit 130 analyzes a result of sensing by the at least one sensor 160 and controls subsequent processes.

The control circuit 130 may control the power supplied to the heater 120 to start or end an operation of the heater 120 based on the result of sensing by the at least one sensor 160. In addition, the control circuit 130 may control the amount of power supplied to the heater 120 and the time the power is supplied based on the result of sensing by the at least one sensor 160 so that the heater 120 may be heated to a predetermined temperature or maintained at an appropriate temperature.

The control circuit 130 may set the heater 120 to a preheating mode to start an operation of the heater 120 when a user input for the aerosol generating device 100 is received. Also, the control circuit 130 may change the mode of the heater 120 from the preheating mode to an operation mode upon detecting a user's puff using a puff detection sensor. In addition, by counting the number of puffs using the puff detection sensor, the control circuit 130 may stop supplying power to the heater 120 when the number of puffs reaches a preset number.

The control circuit 130 may control the user interface 140 based on the result of sensing by the at least one sensor 160. For example, when the number of puffs reaches a preset number according to the puff detection sensor, the control circuit 130 may use at least one of a lamp, a motor, and a speaker to inform a user that the aerosol generating device 100 will be terminated soon.

The control circuit 130 may receive a signal related to wetting from the wetting detection module 170. For example, the control circuit 130 may receive a wetting signal generated when the wetting detection module 170 short-circuits by contacting a liquid.

The control circuit 130 may determine whether the received signal is the wetting signal indicating a short circuit of the wetting detection module 170. For example, when the level of the signal received from the wetting detection module 170 is equal to or greater than a preset threshold, the control circuit 130 may determine that the received signal is the wetting signal.

The control circuit 130 may control to deactivate the heating operation of the heater 120 when it is determined that the wetting signal is received. For example, when it is determined that the wetting signal is received from the wetting detection module 170, the control circuit 130 may control the aerosol generating device 100 to perform a wetting notification, limitation of a heating operation, cut off power supply of the battery 110, and the like, but is not limited thereto.

The wetting notification may be performed using the user interface 140. For example, the aerosol generating device 100 may vibrate to tactilely transmit wetting information to the user. As another example, the aerosol generating device 100 may utilize a display, a lamp or the like that may be included in the aerosol generating device 100 to visually transmit the wetting information to the user. As another example, the aerosol generating device 100 may utilize a speaker or the like that may be included in the aerosol generating device 100 to acoustically transmit the wetting information to the user. In addition, it may be understood by those of ordinary skill in the art to which this embodiment pertains that there may be other types of wetting notification methods.

The user may recognize that the aerosol generating device 100 is wet based on the wetting notification, and may take action against wetting. For example, the user may find a wet portion and wipe off the liquid or stop the puff operation to prevent the deepening of the wetting. Malfunctions, failures, or the like of the aerosol generating device 100 may be prevented by the measures taken against wetting.

In addition, when it is determined that the wetting signal is received, the control circuit 130 may limit the heating operation or cut off the power supplied to the battery to stop the operation of the aerosol generating device 100, and thereby the aerosol generating device 100 may be prevented from malfunctions or failures.

In addition, the wetting notification operation may be performed even when the power of the aerosol generating device 100 is turned off and then turned on again. For example, when it is determined that the wetting signal is received, the control circuit 130 may store wetting information (e.g., time, wetting degree, wetting location, etc.) in the memory 150. Because the control circuit 130 stores the wetting information in the memory 150, even if the power of the aerosol generating device 100 is cut off, the wetting information may be maintained. When the aerosol generating device 100 is turned on again, the wetting information may be provided to the user. Therefore, even when the power of the aerosol generating device 100 is turned off and on, the user may know that the aerosol generating device 100 was wet before the power was cut off, and the user may take action against the wetting accordingly.

The user interface 140 may provide the user with information about the state of the aerosol generating device 100. The user interface 140 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 100 may be implemented by selecting only some of the above-described examples of various user interface 140.

The memory 160, as a hardware component configured to store various pieces of data processed in the aerosol generating device 100, may store data processed or to be processed by the controller 120. The memory 150 may include various types of memories; random access memory (RAM), such as dynamic random access memory (DRAM) and static random access memory (SRAM), etc.; read-only memory (ROM); electrically erasable programmable read-only memory (EEPROM), etc.

The memory 150 may store an operation time of the aerosol generating device 100, the maximum number of puffs, the current number of puffs, at least one temperature profile, data on a user's smoking pattern and wetting information of the aerosol generating device 100 etc.

Although not illustrated in FIG. 1, the aerosol generating device 100 may form an aerosol generating system together with an additional cradle. For example, the cradle may be used to charge the battery 110 of the aerosol generating device 100. For example, while the aerosol generating device 100 is accommodated in an accommodation space of the cradle, the aerosol generating device 100 may receive power from a battery of the cradle such that the battery 110 of the aerosol generating device 100 may be charged.

The aerosol generating device 100 may be exposed to a risk of wetting by an external liquid which is introduced into the aerosol generating device 100 through the connecting port 180 that is exposed to the outside. In addition, the aerosol generating device 100, unlike other electronic devices (e.g., smart phones), may be exposed to the risk of wetting due to an aerosol generating material such as a droplet or a liquid composition that may be generated during an aerosol generating process in the aerosol generating device 100. For example, the liquid composition included in the aerosol generating device 100 may leak due to an external impact or the like, and this leakage may flow into the aerosol generating device 100 and cause problems related to wetting. Droplets by the aerosol may also be introduced into the aerosol generating device 100 due to an external impact or the like, and may similarly cause problems related to wetting.

According to an embodiment, the aerosol-generating device 100 may include the wetting detection module 170 to protect the aerosol generating device 100 from such the risk of wetting. The wetting detection module 170 may be arranged inside the aerosol generating device 100. For example, the wetting detection module 170 may be arranged next to the connecting port 180 on a substrate on which the connecting port 180 is mounted, be arranged on a periphery of a substrate on which the control circuit 130 is mounted, or be arranged in a region of the heater 120 which corresponding to the inside of the aerosol generating device 100. There is no limitation on a position where the wetting detection module 170 may be located, and the wetting detection module 170 may be located at an appropriate position where wetting detection is required.

The wetting detection module 170 may generate a signal indicating wetting when the aerosol generating device 100 is wet. For example, the wetting detection module 170 may generate the wetting signal as the wetting detection module 170 comes into contact with a liquid introduced from the outside of the aerosol generating device 100 or a liquid leaked from the inside of the aerosol generating device 100.

The connecting port 180, as a connection terminal for connecting a peripheral device to the aerosol generating device 100, may be used for the aerosol generating apparatus 100 to communicate with an external device or charge the battery 110 of the aerosol generating device 100, but it is not limited thereto.

The connecting port 180 may be, for example, a universal serial bus (USB) port. In this case, there is no limitation on a version (e.g., USB 3.2) or a USB type (e.g., USB type-C). In addition, it may be understood by those of ordinary skill in the art related to the present embodiment that other types of ports other than the USB port may be used.

FIGS. 2A to 2E are various embodiments of the aerosol generating device 100 of FIG. 1. In other words, the aerosol generating device 100 may be embodied with various types of aerosol generating devices 200a to 200e which use an induction heating method, include a cartridge 220, or include a vaporizer 270. In FIGS. 2A to 2E, batteries 110a to 110e, heaters 120a to 120e, and control circuits 130a to 130e may correspond to the battery 110, the heater 120, and the control circuit 130 of FIG. 1, respectively.

FIG. 2A is a diagram for explaining elements constituting the aerosol generating device 200a including a susceptor according to an example embodiment.

The aerosol generating device 200a may be an example of the aerosol generating device 100.

Referring to FIG. 2A, the aerosol generating device 200a may include a heater 120a including a coil 121 and a susceptor 122, a battery 110a, and a control circuit 130a. However, the aerosol generating device 200a is not limited thereto, and other general-purpose elements may be further included in the aerosol generating device 200a.

The aerosol generating device 200a may generate an aerosol by heating a cigarette accommodated in the aerosol generating device 200a according to an induction heating method. The induction heating method may refer to a method of heating a magnetic material by applying an alternating magnetic field to a magnetic material so that the magnetic material is heated by the alternating magnetic field.

When the alternating magnetic field is applied to the magnetic material, energy loss due to eddy current loss and hysteresis loss may occur in the magnetic material, and the lost energy may be emitted from the magnetic material as thermal energy. As the amplitude or frequency of the alternating magnetic field applied to the magnetic material increases, more thermal energy may be emitted from the magnetic material. The aerosol generating device 200a may emit thermal energy from the magnetic material by applying an alternating magnetic field to the magnetic material, and may transfer the thermal energy emitted from the magnetic material to the cigarette.

The magnetic material that generates heat by the external magnetic field may be the susceptor 122. A susceptor 122 may be provided in the aerosol generating device 200a or may be included in the cigarette in the form of pieces, flakes, or strips.

At least a portion of the material of the susceptor 122 may be formed of a ferromagnetic substance. For example, the material of the susceptor 122 may include metal or carbon. The material of the susceptor 122 may include at least one of ferrite, ferromagnetic alloy, stainless steel, and aluminum (Al). In addition, the material of the susceptor 122 may include at least one of a ceramic such as graphite and zirconia, a transition metal such as nickel (Ni) or cobalt (Co), and a metalloid such as boron (B) or phosphorus (P).

The aerosol generating device 200a may accommodate a cigarette. A space for accommodating a cigarette may be formed in the aerosol generating device 200a. The susceptor 122 may be arranged in the space for accommodating the cigarette. The susceptor 122 may have a cylindrical shape in which an accommodation space for accommodating a cigarette is formed. Accordingly, when the cigarette is accommodated in the aerosol generating device 200a, the cigarette may be accommodated in the accommodation space of the susceptor 122, and the susceptor 122 may be arranged at a position surrounding at least a portion of the outer surface of the cigarette.

The heater 120a may heat the cigarette accommodated in the aerosol generating device 200a. As described above, the heater 120a may heat the cigarette in an induction heating method. The heater 120a may include the susceptor material that generates heat by an external magnetic field, and the aerosol generating device 200a may apply the alternating magnetic field to the heater 120a.

The coil 121 may be provided in the aerosol generating device 200a. The coil 121 may apply the alternating magnetic field to the susceptor 122. When power is supplied to the coil 121 from the aerosol generating device 200a, a magnetic field may be formed inside the coil 121. When an alternating current is applied to the coil 121, a direction of the magnetic field formed inside the coil 121 may be continuously changed. When the susceptor 122 is inside the coil 121 and is exposed the alternating magnetic field whose direction is periodically changed, the susceptor 122 may generate heat, and the cigarette accommodated in the susceptor 122 may be heated.

The coil 121 may be wound around the outer surface of the susceptor 122. The coil 121 may be wound around the inner surface of the outer housing of the aerosol generating device 200a. The susceptor 122 may be in the inner space formed by winding the coil 121, and when power is supplied to the coil 121, the alternating magnetic field generated by the coil 121 may be applied to the susceptor 122.

The battery 110a may supply power to the aerosol generating device 200a. The battery 110a may supply power to the coil 121. The battery 110a may include a converter that converts direct current supplied to the aerosol generating device 200a into alternating current supplied to the coil 121.

The control circuit 130a may control the power supplied to the coil 121. The control circuit 130 may control the battery 110a so that the power supplied to the coil 121 is adjusted. For example, the control circuit 130 may control to constantly maintain a temperature at which the susceptor 122 heats the cigarette based on the temperature of the susceptor 122.

FIG. 2B is a diagram illustrating a replaceable cartridge 220 including an aerosol generating material, and the elements of the aerosol generating device 200b, according to an example embodiment.

The aerosol generating device 200b according to the embodiment shown in FIG. 2B includes a cartridge 220 including an aerosol generating material, and a main body 210 supporting the cartridge 220. The aerosol generating device 200b may correspond to the aerosol generating device 100 of FIG. 1.

The aerosol generating device 200b may consist of the main body 210 without the cartridge 220. In this case, the hardware components of the aerosol generating device 200b are arranged in the main body 210. In another embodiment, the aerosol generating device 200b may be composed of the main body 210 and the cartridge 220. In this case, hardware components of the aerosol generating device 200b may be distributively arranged in the main body 210 and the cartridge 220. Alternatively, certain hardware components of the aerosol generating device 200b may be in each of the main body 210 and the cartridge 220.

The cartridge 220 containing the aerosol generating material may be coupled to the main body 210. The cartridge 220 may be mounted to the main body 210 by a portion of the cartridge 220 being inserted into the accommodation space 219 of the main body 210.

The cartridge 220 may include an aerosol generating material having any one state, such as a liquid state, a solid state, a gaseous state, or a gel state. The aerosol generating material may include a liquid composition. For example, the liquid composition may be a liquid including a tobacco-containing material including a volatile tobacco flavor component, or may be a liquid including a non-tobacco material.

The cartridge 220 converts the phase of the aerosol-generating material inside the cartridge 220 into a gas phase to generate an aerosol, by being operated by an electrical signal or a wireless signal transmitted from the main body 210. The aerosol may refer to a gas in a state in which vaporized particles generated from an aerosol generating material are mixed with air.

The heater 120b may include a metal material such as copper, nickel, or tungsten in order to heat the aerosol generating material delivered to a liquid delivery means by generating heat by electrical resistance. The heater 120b may be implemented as, for example, a metal heating wire, a metal heating plate, a ceramic heating element, etc. The heater 120b may be implemented as a conductive filament using a material such as a nichrome wire, be wound around the liquid delivery means, or be arranged adjacent to the liquid delivery means.

FIGS. 2C to 2E are diagrams illustrating examples in which a cigarette 260 is inserted into the aerosol generating devices 200c to 200e according to an example embodiment.

Referring to FIG. 2C, the aerosol generating device 200c may include a battery 110c, a heater 120c and a control circuit 130c. Referring to FIGS. 2D and 2E, the aerosol generating device 200d to 200e may further include a vaporizer 270. Also, the aerosol generating article 260 may be inserted into an inner space of the aerosol generating device 200c through 200e. The aerosol generating devices 200c to 200e may correspond to the aerosol generating device 100 of FIG. 1.

FIGS. 2C through 2E illustrate components of the aerosol generating device 200c through 200e, which are related to the present embodiment. Therefore, it will be understood by one of ordinary skill in the art related to the present embodiment that other general-purpose components may be further included in the aerosol generating device 200c through 200e, in addition to the components illustrated in FIGS. 2C through 2E.

Also, FIGS. 2D and 2E illustrate that the aerosol generating device 200d and 200e includes the heater 120d and 120e. However, as necessary, the heater 120d and 120e may be omitted.

FIG. 2C illustrates that the battery 110c, the control circuit 130c, and the heater 120c are arranged in series. Also, FIG. 2D illustrates that the battery 110d, the control circuit 130d, the vaporizer 1270, and the heater 120d are arranged in series. Also, FIG. 2E illustrates that the vaporizer 270 and the heater 120e are arranged in parallel. However, the internal structure of the aerosol generating device 200c through 200e is not limited to the structures illustrated in FIGS. 2C through 2E. In other words, according to the design of the aerosol generating device 200c through 200e, the battery 110c through 110e, the control circuit 130c through 130e, the heater 120c through 120e, and the vaporizer 270 may be differently arranged.

When the aerosol generating article 260 is inserted into the aerosol generating device 200c through 200e, the aerosol generating device 200c through 200e may operate the heater 120c through 120e and/or the vaporizer 270 to generate aerosol from the aerosol generating article 260 and/or the vaporizer 270. The aerosol generated by the heater 120c through 120e and/or the vaporizer 270 is delivered to a user by passing through the aerosol generating article 260.

The battery 110c through 110e may supply power to be used for the aerosol generating device 200c through 200e to operate.

The vaporizer 270 may generate aerosol by heating a liquid composition and the generated aerosol may pass through the aerosol generating article 260 to be delivered to a user. In other words, the aerosol generated via the vaporizer 270 may move along an air flow passage of the aerosol generating device 200d and 200e and the air flow passage may be configured such that the aerosol generated via the vaporizer 270 passes through the aerosol generating article 260 to be delivered to the user.

For example, the vaporizer 270 may include a liquid storage, a liquid delivery element, and a heating element, but it is not limited thereto. For example, the liquid storage, the liquid delivery element, and the heating element may be included in the aerosol generating device 200d and 200e as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 270 or may be formed integrally with the vaporizer 270.

The vaporizer 270 may be referred to as a cartomizer or an atomizer, but it is not limited thereto.

Although not illustrated in FIGS. 2C through 2E, the aerosol generating device 200c through 200e and an additional cradle may form together a system. For example, the cradle may be used to charge the battery 110c through 110e of the aerosol generating device 200c through 200e. Alternatively, the heater 120c through 120e may be heated when the cradle and the aerosol generating device 200c through 200e are coupled to each other.

According to various embodiments, the aerosol generating device 100 of FIG. 1 may include at least one of the types of the aerosol generating devices 200a to 200e of FIGS. 2A to 2E. For example, the aerosol generating device 100 may have a different arrangement of internal components as shown in FIGS. 2A to 2E, and different types of cigarettes or cartridges may be used. According to an embodiment, the aerosol generating device 100 may include at least some of the configurations and/or functions of the aerosol generating devices 200a to 200e of FIGS. 2A to 2E. According to another embodiment, the aerosol generating method of the aerosol generating device 100 may include the same and/or similar method to the aerosol generating method of the aerosol generating device 200a to 200e of FIGS. 2A to 2E.

FIG. 3 is a diagram illustrating examples of a region in which a wetting detection module may be located inside an aerosol generating device according to an example embodiment.

Referring to FIG. 3, the aerosol generating device 300 may include a connecting port 330, a control circuit 350, and a heater 370. The aerosol generating device 300 corresponds to the aerosol generating devices 100 and 200a to 200e of FIGS. 1 and 2A to 2E described above, and may perform the functions of the aerosol generating devices 100 and 200a to 200e described above.

The connecting port 330, the control circuit 350, and the heater 370 respectively correspond to the connecting port 180, the control circuit 130 and the heater 120 of FIG. 1 described above, and may perform the functions of the connecting port 180, the control circuit 130, and the heater 120 described above, respectively.

The wetting detection module 170 shown in FIG. 1 may be located inside the aerosol generating device 300. For example, the wetting detection module 170 may be located on the periphery 311 of the connecting port 330 as shown in FIG. 3. In addition, the wetting detection module 170 may be located only on a part of the periphery 311 of the connecting port 330. In addition, although not shown in FIG. 3, the wetting detection module 170 may be located on a path through which the liquid introduced from the connecting port 330 may penetrate into the internal element of the aerosol generating device 300. It may be understood by those of ordinary skill in the art to which this embodiment pertains that the wetting detection module 170 may be arranged differently to detect wetting.

The wetting detection module 170 located on the periphery of the connecting port 330 may detect a liquid flowing in through the connecting port 330 exposed to the outside.

As another example, the wetting detection module 170 may be disposed on the periphery 312 of the control circuit 350 as shown in FIG. 3. For example, the wetting detection module 170 may be arranged to surround the control circuit 350 or may be located adjacent to a portion of the control circuit 350. Although not shown in FIG. 3, the wetting detection module 170 may be located on a path through which the liquid may flow into the control circuit 350. The wetting detection module 170 arranged on the periphery of the control circuit 350 may detect a liquid flowing in from outside of the aerosol generating device 300 or a liquid leaking from inside of the aerosol generating device 300. The wetting detection module 170 may prevent wetting from occurring by detecting a liquid introduced from outside of the aerosol generating device 300 or a liquid leaking from inside of the aerosol generating device 300.

Because the control circuit 350 is hardware that controls the overall operation of the aerosol generating device 300 and it is sensitive to wetting, wetting of the circuit 350 may cause a fatal problem in the aerosol generating device 300. According to an embodiment, the wetting detection module 170 may prevent problems such as malfunctions or failures of the aerosol generating device 300 by detecting the wetting.

As another example, the wetting detection module 170 may be arranged adjacent to the heater 370. For example, the wetting detection module 170 may be arranged on the periphery 313 of a portion of the heater 370 which is not exposed to the outside. The heater 370 included in the aerosol generating device 300 may include a portion (hereinafter "exposed portion") exposed to the outside so as to be in contact with the cigarette, and may include a portion (hereinafter "concealed portion") arranged inside the aerosol generating device 300 so as to be connected to the battery, the control circuit 350, the cartridge, and the vaporizer. The wetting detection module 170 may be arranged to surround the periphery 313 of a concealed portion of the heater 370. Alternatively, the wetting detection module 170 may be arranged adjacent to a portion of a concealed portion of the heater 370. In addition, although not shown in FIG. 3, the wetting detection module 170 may be arranged adjacent to the heater 370 and on a path through which a liquid may be flowing into an internal element of the aerosol generating device 300, such as a cartridge or a vaporizer.

The wetting detection module 170 arranged on the periphery 313 of a concealed portion of the heater 370 may detect a liquid introduced from outside of the aerosol generating device 300 or a liquid leaking from inside of the aerosol generating device 300. Accordingly, the wetting detection module 170 may prevent the wetting from occurring.

Meanwhile, a plurality of wetting detection modules 170 may be arranged on each of the periphery 311 of the connecting port 330, the periphery 312 of the control circuit 350, and the periphery 313 of the heater 370. In other words, the number of wetting detection modules 170 that may be arranged is not limited, and the number of arranged wetting detection modules 170 may be adjusted as needed.

In addition, the wetting detection module 170 may be arranged adjacent to (i.e., on the periphery of) all of the connecting port 330, the control circuit 350, and the heater 370. Alternatively, the wetting detection module 170 may be arranged adjacent to only some of the connecting port 330, the control circuit 350, and the heater 370. For example, the wetting detection module 170 may be only arranged adjacent to the connecting port 330 and the control circuit 350. As another example, the wetting detection module 170 may be only arranged adjacent to the control circuit 350. In addition, the wetting detection modules 170 may be arranged adjacent to other hardware components included in the aerosol generating device 300.

The arrangement of the wetting detection module 170 is not limited to the above-described example. There is no limitation on a position where the wetting detection module 170 may be arranged, and the wetting detection module 170 may be arranged at any appropriate locations where wetting detection is required.

FIG. 4 is a diagram for explaining that a wetting detection module according to an example embodiment detects wetting by being electrically shorted by coming into contact with a liquid.

A wetting detection module 400 shown in FIG. 4 corresponds to the wetting detection module 170 of FIG. 1 described above, and may perform functions of the wetting detection module 170 described above.

Referring to FIG. 4, the wetting detection module 400 may include a first pole 410 and a second pole 430. The first pole 410 and the second pole 430 may be made of a conductive material. The wetting detection module 400 may further include additional poles in addition to the illustrated two poles 410 and 430.

The plurality of poles 410 and 430 included in the wetting detection module 400 may be arranged to be spaced apart from each other. In other words, the plurality of poles 410 and 430 may be arranged without contacting each other as shown in FIG. 4.

Because the first pole 410 and the second pole 430 are spaced apart, the liquid 450 may penetrate between the first pole 410 and the second pole 430. FIG. 4 is a diagram illustrating a normal state 470 where no liquid exists between the first pole 410 and the second pole 430, and a wetting state 490 where the liquid 450 penetrates between the first pole 410 and the second pole 430.

In the normal state 490, the wetting detection module 400 may be electrically shorted by the liquid 450, and may generate the wetting signal by being electrically shorted. Specifically, if the wetting detection module 400 is electrically short-circuited as the liquid 450 penetrates into the region between the first pole 410 and the second pole 430, and the wetting detection module 400 may generate the wetting signal. The wetting signal may be transmitted to the control circuit 130. If a signal is received, the control circuit 130 may determine whether the received signal is the wetting signal indicating a short circuit of the wetting detection module. For example, when the level of the received signal exceeds a threshold, which is a preset value, it may be determined that the received signal is a wetting signal. In another example, when the level of the received signal is less than or equal to the threshold that is a preset value, it may be determined that the received signal is the wetting signal.

In the wetting state 490, as shown in FIG. 4, the liquid 450 may penetrate to fill most of the space between the first pole 410 and the second pole 430. Alternatively, the liquid 450 may penetrate so that only a portion of the space between the first pole 410 and the second pole 430 is in contact with the liquid 450.

The wetting detection module 400 may generate a wetting signal having a different signal level depending on the degree of wetting. Like the wetting state 490 shown in FIG. 4, if the liquid 450 penetrates to fill most of the space between the first pole 410 and the second pole 430, it may be said that the degree of wetting is serious. Conversely, when the liquid 450 penetrates so that only a portion of the space between the first pole 410 and the second pole 430 is in contact with the liquid 450, it may be said that the degree of wetting is slight. When severe wetting occurs in the wetting detection module 400, a wetting signal may have a greater signal level than when slight wetting occurs. In another example, when severe wetting occurs in the wetting detection module 400, a wetting signal may have a smaller signal level than when slight wetting occurs.

Meanwhile, the liquid 450 penetrating between the first pole 410 and the second pole 430 may be a liquid introduced from the outside of the aerosol generating device 100, and may be a liquid leaked from inside the aerosol generating device 100. For example, the liquid 450 may be a liquid from the external environment (e.g., raindrop) which is introduced through the connecting port 180. In addition, the liquid 450 may be a droplet that may be generated by the aerosol during the aerosol generation process. Also, the liquid 450 may be a liquid composition provided as an aerosol generating material. For example, the liquid composition included in the aerosol generating device 100 may leak into the aerosol generating device 100 due to an external impact, etc. However, the liquid 450 is not limited to the above-described example.

FIGS. 5A to 5D are diagrams for explaining a wetting detection module according to an example embodiment.

A wetting detection module 400 may be electrically short-circuited, and thus physical, chemical, mechanical or electrical characteristics of the wetting detection module 400 may be changed. The wetting detection module 400 may generate a wetting signal having a different level from other signals generated before it is short-circuited, based on the changed characteristics. Accordingly, the control circuit 130 of FIG. 1 may determine whether the aerosol generating device 100 of FIG. 1 is wet, based on a level of the signal received from the wetting detection module 400. For example, the control circuit 130 may determine that wetting has occurred (i.e., wetting signal has been received) if the level of a signal received from the wetting detection module 400 exceeds a predetermined threshold. According to an embodiment, the wetting detection module 400 may generate a signal having a signal level lower than or equal to the threshold while there is no wetting. Alternatively, the wetting detection module 400 may not generate any signals detectable by the control circuit 410 while there is no wetting. In addition, the control circuit 130 may determine a degree of wetting, a location where the wetting occurred, and the like based on the signal level of the wetting signal (i.e., a signal having a signal level exceeding the threshold), which will be described below.

Referring to FIG. 5A, two nodes of the wetting detection module 400 which are not electrically connected may be connected to each other as the wetting detection module 400 is electrically shorted by contacting the liquid. As a result, a new current that has not been previously sensed may be sensed.

For example, the first pole 410 and the second pole 430 arranged to be spaced apart may be connected to a power application terminal 510 (e.g., a battery, a power control circuit, etc.) and a ground 511, respectively. Without wetting, even if the first pole 410 and the second pole 430 arranged to be spaced apart are respectively connected to the power application terminal 510 and the ground 511, the first pole 410 and the second pole 430 may not be electrically connected to each other. However, as a liquid permeates into a region between the first pole 410 and the second pole 430, the first pole 410 and the second pole 430 are electrically connected to each other, causing a new current to flow.

The wetting detection module 400 may generate the wetting signal having a different signal level based on the intensity of the flowing current. For example, the wetting detection module 400 may not generate the wetting signal before the first pole 410 is electrically connected to the second pole 430, and may generate the wetting signal when the first pole 410 and the second pole 430 are electrically connecting to each other such that a current flows.

However, the wetting detection module 400 is not limited thereto, and may operate in the opposite manner. For example, the wetting detection module 400 may generate a wetting signal having a certain signal level in the normal state, and the control circuit 130 may determine that wetting has occurred when the wetting detection module 400 does not generate a wetting signal due to a short circuit.

Referring to FIG. 5B, as the wetting detection module 400 comes into contact with a liquid, the wetting detection module 400 is electrically short-circuited. As a result, the intensity of the current flowing through the wetting detection module 400 may be changed. In other words, the intensity of the current flowing through the wetting detection module 400 before contact with the liquid may be different from the intensity of the current flowing through the wetting detection module 400 after contact with the liquid. Also, the intensity of the current flowing through the wetting detection module 400 may be different depending on the degree of wetting. In other words, as the liquid penetrates into the region between the first pole 410 and the second pole 430 included in the wetting detection module 400, the first pole 410 is electrically connected to the second pole 430. As a result, the intensity of the flowing current may be changed.

The wetting detection module 400 may be connected to a current sensor 512, and the change in the intensity of the current flowing through the wetting detection module 400 may be measured using the current sensor 512 connected to the wetting detection module 400. In addition, based on the intensity of the current measured by using the current sensor 512, the wetting signal having a different signal level may be generated from the wetting detection module 400.

Referring to FIG. 5C, the wetting detection module 400 may be electrically shorted as the wetting detection module 400 comes into contact with a liquid. As a result, the capacitance of the wetting detection module 400 may be changed. For example, as the liquid penetrates into the region between the first pole 410 and the second pole 430 included in the wetting detection module 400, the capacitance of the wetting detection module 400 may be changed due to a change in dielectric constant or a change in electrical characteristics due to an electrical short circuit. The wetting detection module 400 may be connected to a capacitive sensor 513, and a change in capacitance of the wetting detection module 400 may be measured using the capacitive sensor 513 connected to the wetting detection module 400. Also, based on the capacitance measured using the capacitive sensor 513, a wetting signal having a different signal level may be generated from the wetting detection module 400.

Referring to FIG. 5D, as the wetting detection module 400 comes into contact with a liquid, the wetting detection module 400 is electrically shorted. As a result, the analog-to-digital conversion (ADC) value of the wetting detection module 400 may be changed. For example, as the liquid penetrates into the region between the first pole 410 and the second pole 430 included in the wetting detection module 400, the level of the voltage applied to the wetting detection module 400, the intensity of the current flowing through the wetting detection module 400, the dielectric constant of the wetting detection module 400, and the capacitance of the wetting detection module 400 may be changed. Accordingly, the ADC value may be changed due to the above-described change.

The wetting detection module 400 may be connected to the analog-to-digital converter 514, and the ADC value of the wetting detection module 400 may be derived using the analog-to-digital converter 514. In addition, based on the ADC value, a wetting signal having a different signal level may be generated from the wetting detection module 400.

As described above, the control circuit 130 may determine whether wetting has occurred, the degree of wetting, and the location of wetting based on a signal level of a wetting signal.

FIG. 6 is a flowchart illustrating a method of operating an aerosol generating device according to an example embodiment. The method of operating the aerosol generating device of FIG. 6 includes operations processed in the aerosol generating device 100 of FIG. 1.

Referring to FIG. 6, in operation S610, the control circuit 130 included in the aerosol generating device 100 may periodically monitor a signal generated by (i.e., received from) the wetting detection module 170. For example, the control circuit 130 may monitor the signal generated by the wetting detection module 170 every second, but is not limited thereto.

In operation S630, the control circuit 130 included in the aerosol generating device 100 may determine whether the level of a signal received from the wetting detection module 170 exceeds a preset threshold. For example, as described above with reference to FIGS. 5A to 5D, based on at least one of capacitance, intensity of current, and Analog-to-Digital Conversion (ADC) value of the wetting detection module 170, a wetting signal having a different signal level may be generated from the wetting detection module 170. The control circuit 130 may determine whether the level of the signal that is generated based on at least one of the capacitance, the intensity of current, and the ADC value of the wetting detection module 170 exceeds a preset threshold value.

In operation S650, the control circuit 130 included in the aerosol generating device 100 may determine that the wetting signal has been received (i.e., the received signal is the wetting signal) when the level of the received signal exceeds a preset threshold.

On the other hand, when the level of the monitored signal is less than or equal to a preset threshold, the control circuit 130 may determine that the wetting signal has not occurred, and return to operation S610 to monitor the signal generated by the wetting detection module 170 at a predetermined period.

As described above, the aerosol generating device 100 may include a wetting detection module 170. As the wetting detection module 170 is electrically short-circuited, at least one of the intensity of the current flowing through the wetting detection module 170, the capacitance of the wetting detection module 170, and ADC value of the wetting detection module 170 changes. The wetting detection module 170 generates a wetting signal having a different signal level based on the level of the current, the capacitance, and the ADC value. The control circuit 130 included in the aerosol generating device 100 may monitor the wetting signal periodically and determine that the wetting signal is received when the level of the wetting signal exceeds a preset threshold value.

In operation S670, the control circuit 130 included in the aerosol generating device 100 may control the heater 120 based on the wetting signal when it is determined that the wetting signal has been received. For example, the control circuit 130 may control the aerosol generating device 100 to perform a wetting notification, limit (e.g., deactivate) a heating operation of the heater 120, cut off power supply of the battery 110, etc.

FIG. 7 is a diagram illustrating a process of controlling an operation of the aerosol generating device based on a level of a wetting signal according to an example embodiment.

Referring to FIG. 7, in operation S710, the control circuit 130 included in the aerosol generating device 100 may measure a level of the wetting signal. The level of the wetting signal may vary depending on the degree of wetting of the wetting detection module 170. For example, the wetting signal value when the degree of wetting is severe may be measured to be greater than the value of the wetting signal when the degree of wetting is slight, and vice versa. In addition, as described above with reference to FIGS. 5A to 5D, the level of the wetting signal may vary based on capacitance, intensity of current, and ADC value that is changed when the wetting detection module 400 short-circuits by a liquid.

In operation S730, the control circuit 130 included in the aerosol generating device 100 may determine whether the level of the measured wetting signal is equal to or greater than a first threshold value.

In operation S750, the control circuit 130 included in the aerosol generating device 100 may determine whether the level of the wetting signal is equal to or greater than a second threshold value when it is determined that the level of the wetting signal is equal to or greater than the first threshold value.

In operation S770, when it is determined that the level of the wetting signal is greater than or equal to the first threshold and less than the second threshold, the control circuit 130 may limit a heating operation until the level of the wetting signal is less than a first threshold as the liquid vaporizes.

For example, assuming that the level of the wetting signal increases as the degree of wetting increases, it may be determined that slight wetting has occurred if the level of the wetting signal is greater than or equal to the first threshold value and less than the second threshold value. In this case, wetting is not expected to cause serious problems such as malfunction or failure of the aerosol generating device 100. However, if the heating operation of the aerosol generating device 100 continues through the slight wetting, problems such as malfunction or failure of the aerosol generating device 100 may occur. Therefore, when the above-described slight wetting occurs, the heating operation of the aerosol generating device 100 may be limited to prevent problems such as malfunction or failure.

In the case of slight wetting, the wetting problem may be solved easily. For example, the liquid that was the cause of wetting may be vaporized over time. Accordingly, the control circuit 130 may limit the heating operation of the aerosol generating device 100 until the level of the wetting signal is less than the first threshold value.

In operation S790, the control circuit 130 included in the aerosol generating device 100 may cut off power supply of the battery 110 included in the aerosol generating device 100 when it is determined that the level of the wetting signal is equal to or greater than the second threshold value. For example, when the level of the wetting signal is equal to or greater than the second threshold value, it may be determined that severe wetting occurs. In this case, a serious problem such as malfunction or failure of the aerosol generating device 100 may occur due to the severe wetting. Therefore, when severe wetting occurs, the power supply of the battery 110 included in the aerosol generating device 100 may be cut off. By cutting off the power supply of the battery 110, it is possible to prevent aggravation of problems such as malfunction and failure due to wetting. In addition, the user may recognize that the power supply of the battery 110 of the aerosol generating device 100 is cut off and take action against the wetting.

In addition, before the power supply of the battery 110 is cut off, as described above, information on wetting may be stored in the memory 150 of the aerosol generating device 100.

The number of threshold values are not limited. For example, the aerosol generating device 100 may include more threshold values in addition to the above-described two threshold values depending on the level of the wetting signal.

FIGS. 8A to 8C are diagrams illustrating examples in which a wetting detection module is arranged in an aerosol generating device according to an example embodiment.

As shown in FIGS. 8A to 8C, a plurality of wetting detection modules 811 to 814, 831 to 833, and 851 to 853 may be arranged inside the aerosol generating device 100. According to embodiment, the number of wetting detection modules 170 included in the aerosol generating device 100 may be different from that shown in FIGS. 8A to 8C.

The plurality of wetting detection modules may generate wetting signals having different signal levels when short-circuited. For example, if the capacitance or dielectric constant is different among the plurality of wetting detection modules, and the wetting signals generated by the plurality of wetting detection modules may have different signal levels according to different capacitance values or dielectric constants.

As another example, a plurality of wetting detection modules and resistors may be connected in series, so that the wetting signals generated from the wetting detection modules may different signal levels. The resistors respectively connected to the plurality of wetting detection modules may have the same value or different values. In the case of connecting resistors having different values to the wetting detection modules, the intensity of the current flowing through the wetting detection modules arranged at different locations may have different values. In other words, the level of the wetting signal may be different for each location where each wetting detection module is arranged. In this case, based on the level of the wetting signals, it may be determined which wetting detection module among the plurality of wetting detection modules is wet.

Accordingly, the control circuit 130 may identify the location of the electrically shorted wetting detection module among the plurality of wetting detection modules 170 based on wetting signals having different signal levels. As a result, more suitable measures for wetting may be taken. For example, when a user recognizes that the wetting has occurred in the connecting port 180, the user may eliminate the cause of wetting by wiping off the liquid that causes the wetting. As another example, when it is determined that the wetting has occurred inside the aerosol generating device, the user may check the damage of the aerosol generating device due to an external impact.

Referring to FIG. 8A, the wetting detection modules 811 to 814 may be arranged on the periphery of a device 820 included in the aerosol generating device. For example, as shown in FIG. 8A, the wetting detection modules 811 to 814 may be arranged to surround the device 820 such as a control circuit and an MCU. In addition, although not shown in FIG. 8A, the wetting detection modules 811 to 814 may be only arranged next to a portion of the device 820 that included in the aerosol generating device. When the wetting detection modules 811 to 814 are located near the device 820 such as the control circuit and the MCU, it is possible to prevent serious wetting of important configuration of the aerosol generating device. As a result, malfunctioning or the failure of the aerosol generating device may be prevented.

Referring to FIG. 8B, the wetting detection modules 831 to 833 may be arranged on the periphery of a connecting port 840. However, the number and arrangement of the wetting detection modules 831 to 833 are not limited thereto. Because the wetting detection modules 831 to 833 are arranged on the periphery of the connecting port 840, it is possible to prevent wetting by a liquid that may be introduced through the connecting port 840 from the outside.

Referring to FIG. 8C, the wetting detection modules 851 to 853 in the aerosol generating device 870 may be arranged on the periphery of a concealed portion of a heater 860. When the wetting detection modules 851 to 853 arranged on the periphery of the heater 860 are electrically shorted as the wetting detection modules 851 to 853 come into contact with the liquid, is the control circuit 130 may determine that wetting has occurred based on the wetting signals from the wetting detection modules 851 to 853. In this case, the control circuit 130 may increase the temperature by heating the heater so that the liquid penetrating into the wetting detection modules 851 to 853 arranged on the periphery of the heater 860 may be vaporized. Accordingly, the aerosol generating device 870 may solve the wetting problem by itself.

In addition, there is no limit to the number of wetting detection modules arranged on the periphery of the device 820, the number of wetting detection modules arranged on the periphery of the connecting port 840, and the number of wetting detection modules arranged on the periphery of a concealed portion of the heater 860. For example, although not shown in FIGS. 8A to 8C, two or more wetting detection modules may be arranged on each side of the device 820, the connecting port, and the concealed portion of the heater 860.

FIGS. 9A to 9E are diagrams illustrating shapes of a wetting detection module according to an example embodiment.

The wetting detection module 400 of FIG. 4 may have various shapes, and the shape is not limited. For example, the wetting detection module 400 may have a shape as shown in FIGS. 9A to 9E. Referring to FIGS. 9A to 9E, the wetting detection module 400 may have a shape such as a rectangle, a circle, a bar, a bent shape, a curved shape, or the like. However, the shape of the wetting detection module 400 is not limited thereto, and it may be understood by those skilled in the art that the wetting detection module 400 may have various shapes.

In addition, the wetting detection module 400 may include additional poles in addition to the two poles respectively shown in FIGS. 9A to 9E.

FIG. 10 is a diagram illustrating an example in which wetting detection modules having various shapes are arranged on a substrate on which a control circuit is mounted, according to an example embodiment.

Referring to FIG. 10, wetting detection modules 1051 to 1054 have a shape corresponding to the boundary of a control circuit 1030 such that the wetting detection modules 1051 to 1054 are arranged on the periphery of the control circuit 1030 on a substrate 1000.

For example, the wetting detection module 1051 has a bent shape in consideration of the bent boundary of the control circuit 1030 and the shape and location of a peripheral circuit element 1011, such that the wetting detection module 1051 is located at a position corresponding to the bent shape.

In addition, the wetting detection module 1052 has a curved shape in consideration of the curved boundary of the control circuit 1030 and the shape and position of a peripheral circuit element 1012, such that the wetting detection module 1052 is located at a position corresponding to the curved shape.

In addition, the wetting detection module 1053 has a bent shape in consideration of the bent boundary of the control circuit 1030 and the shape and position of peripheral circuit elements 1013 and 1014, such that the wetting detection module 1053 is located at a position corresponding to the bent shape.

In addition, the wetting detection module 1054 has a triangular shape in consideration of the shape and position of the flat boundary of the control circuit 1030 and peripheral circuit elements 1011 and 1014, such that the wetting detection module 1054 is located at a position corresponding to the triangular shape.

That is, the wetting detection modules 1051 to 1054 are manufactured to correspond to the shape of a boundary of the control circuit 1030 on the substrate 1000, and are disposed on the corresponding positions. Thus, the aerosol generating device according to an embodiment may prevent wetting more precisely and safely than when wetting detection modules having the same shape are arranged without considering the shape of the control circuit 1030 or the shape and location of the peripheral circuit elements 1011 and 1014, etc.

FIG. 11 is a flowchart illustrating a method of operating an aerosol generating device according to an example embodiment.

Referring to FIG. 11, the method of operating the aerosol generating device includes operations processed in the aerosol generating device 100 shown in FIG. 1.

In operation S1110, the wetting detection module may generate a wetting signal when it is electrically shorted by contacting the liquid introduced from outside of the aerosol generating device 100 or the liquid leaked from inside of the aerosol generating device 100. The level of the wetting signal may vary depending on various causes, such as the degree of wetting and the location where the wetting occurred.

In operation S1130, the control circuit 130 included in the aerosol generating device 100 may determine whether a wetting signal indicating an electrical short is received from the wetting detection module 170. For example, when the level of the signal received from the wetting detection module 170 exceeds a preset threshold, the control circuit 130 may determine that the received signal is the wetting signal.

In operation S1150, the control circuit 130 included in the aerosol generating device 100 may control the heating operation of the heater 120 when it is determined that the wetting signal is received. For example, when it is determined that a wetting signal is received from the wetting detection module 170, the control circuit 130 may control the aerosol generating device 100 to perform a wetting notification, limit a heating operation, cut off a power supply of the battery 110, and the like.

At least one of the components, elements, modules or units (collectively "components" in this paragraph) represented by a block in the drawings, such as the wetting detection module 170 or the control circuit 130 in FIG. 1, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
a heater configured to heat an aerosol generating material;
at least one wetting detection module configured to generate a wetting signal when short-circuited by a liquid which is introduced from outside of the aerosol generating device or leaked from inside of the aerosol generating device; and
a control circuit configured to control operation of the heater based on the wetting signal,
wherein the at least one wetting detection module is configured to generate the wetting signal having a different signal level depending on a degree of wetting, and
wherein the control circuit is configured to:
when a signal level of the wetting signal is greater than or equal to a first threshold and less than a second threshold, limit a heating operation of the heater until the signal level of the wetting signal drops below the first threshold, and
when the signal level of the wetting signal is equal to or greater than the second threshold, cut off a battery power supply.

2. The aerosol generating device of claim 1, wherein the at least one wetting detection module is arranged on a periphery of the control circuit on a substrate on which the control circuit is mounted.

3. The aerosol generating device of claim 1, further comprising a connecting port for communicating with an external device or charging a battery of the aerosol generating device,
wherein the at least one wetting detection module is located on a periphery of the connecting port.

4. The aerosol generating device of claim 1, wherein the control circuit is configured to perform at least one of a wetting notification, limiting of a heating operation of the heater, and cutting off power supply of a battery based on the wetting signal being received.

5. The aerosol generating device of claim 1, wherein the at least one wetting detection module comprises a first pole and a second pole spaced apart from the first pole, and is configured to generate the wetting signal when the first pole and the second pole are electrically connected by the liquid penetrating into a region between the first pole and the second pole.

6. The aerosol generating device of claim 1, wherein
as the at least one wetting detection module is short-circuited, at least one of an intensity of current flowing through the at least one wetting detection module, a capacitance of the at least one wetting detection module, and an analog-to-digital conversion (ADC) value of the at least one wetting detection module changes,
the signal level of the wetting signal varies depending on the intensity of the current, the capacitance, and the ADC value, and
the control circuit is configured to periodically monitor a signal received from the at least one wetting detection module and determine that the wetting signal has been received when the signal level of the signal received from the at least one wetting detection module exceeds a preset threshold.

7. The aerosol generating device of claim 1, wherein
the at least one wetting detection module comprises a plurality of wetting detection modules arranged in different locations,
the plurality of wetting detection modules are configured to generate wetting signals of different signal levels when short-circuited by the liquid, and
the control circuit is configured to determine a location of a short-circuited wetting detection module among the plurality of wetting detection modules based on the different signal levels of the wetting signals.

8. The aerosol generating device of claim 1,
wherein the at least one wetting detection module is located on a periphery of a concealed portion of the heater which is not exposed to the outside, and
the control circuit is configured to heat the heater based on the wetting signal being received from the at least one wetting detection module such that the liquid is vaporized.

9. The aerosol generating device of claim 5, wherein the first pole and the second pole have a shape corresponding to a boundary of the control circuit and are arranged on a periphery of the control circuit, on a substrate on which the control circuit is mounted.

10. The aerosol generating device of claim 1, wherein the control circuit is configured to control, based on the wetting signal, the heater to increase a temperature such that the liquid is vaporized.

11. A method of operating the aerosol generating device of claim 1, the method comprising:
generating a wetting signal when a wetting detection module of the aerosol generating device is short-circuited by a liquid which is introduced from outside of the aerosol generating device or leaked from inside of the aerosol generating device; and
controlling operation of a heater of the aerosol generating device based on the wetting signal.

* * * * *